Patented May 18, 1943

2,319,707

UNITED STATES PATENT OFFICE 2,319,707

PRODUCTION OF ALIPHATIC DIHYDRIC ALCOHOLS

Walter Reppe, Willi Schmidt, Alfred Schulz, and Hans Wenderlein, Ludwigshafen-on-the-Rhine, Germany, assignors, by mesne assignments, to General Aniline & Film Corporation, New York, N. Y., a corporation of Delaware No Drawing. Application April 4, 1939, Serial No. 265,970. In Germany April 16, 1938

7 Claims. (Cl. 260—635)

The present invention relates to the production of aliphatic divalent alcohols.

We have found that valuable compounds containing oxygen are obtained by leading butin-2-diol-1.4 or its 1.4-substitution products, in particular its lower alkyl substitution products, such as 1.4-dimethyl-, 1.4-diethyl-, 1.1.4.4-tetramethyl-1.4-dimethyl-1.4-diethylbutin-2-diol, together with hydrogen over hydrogenation catalysts.

In this way it is possible to prepare pure hydrogenation products of butin-2-diol-1.4 and its substitution products, and by suitable choice of the reaction conditions, it is not only possible to hydrogenate butindiols in excellent yields into 1.4-butane-diols, but also to obtain 1.4-butene-diols, normal butanols or tetrahydrofuranes in uninterrupted reaction.

Among initial materials for the process according to this invention there are suitable not only butin-2-diol-1.4 but also its 1.4-substitution products such as can be obtained for example according to the U. S. application Ser. No. 223855, filed August 9, 1938, in the name of Walter Reppe and Ernst Keyssner, now Patent No. 2,232,867. The hydrogenation is most suitably carried out in the liquid phase, and it is preferable to use aqueous solutions of the butindiols or also their solutions in organic solvents, such as alcohols or dioxane or mixtures of the same. Organic solvents are used in particular for the hydrogenation of butindiols difficultly soluble in water.

The hydrogen used in the hydrogenation may be diluted, when working in the gas phase and also when working in the liquid phase, for example with carbon dioxide, nitrogen, low molecular saturated hydrocarbons, ethers or alcohols.

The catalysts used for adding on hydrogen to carbon-carbon, carbon-nitrogen, carbon-oxygen or nitrogen-oxygen multiple linkages are generally speaking suitable as catalysts according to this invention. When working in the liquid phase they may be suspended in the initial materials or their solutions or rigidly arranged in a vessel through which the initial material flows together with hydrogen or applied to suitable filler bodies. When working in the gas phase, shaped catalysts or catalysts applied to carriers must be used. Metal catalysts applied to carriers are especially suitable, as for example nickel, copper or cobalt or mixtures of these metals with one another or with other metals, such as chromium, e. g. mixtures of nickel (10 to 15 per cent), copper (5 to 10 per cent) and chromium (0.5 to 1 per cent), the rest being carrier substance. Chromium or chromium compounds, such as chromic acid, chromic nitrate or ammonium bichromate are good activating agents for non-noble metallic hydrogenation catalysts.

The nature and amount of the final products depend on the reaction conditions and on the nature and the activity of the catalyst. Thus for example noble metals or non-noble metals, such as nickel, copper or cobalt catalysts or mixtures thereof, if desired activated with chromium, at ordinary or slightly elevated temperatures and increased hydrogen pressures yield butane-diols especially smoothly. Suitable temperatures are within the range of from 15° to 150° C., whereas the pressures may exceed 10 atmospheres up to 50, 100, 200, 500 or 800 atmospheres or more, the upper limit depending on the stability of the reaction vessel. The best yields per unit of space and time are obtained when using temperatures of from about 15 to 100° C. and hydrogen pressures of more than 200 atmospheres.

If care be taken for a diminution in the activity of the catalysts, as for example by using a platinum catalyst which is applied to an acid active carbon or by mixing carbon monoxide with the hydrogen when using a nickel, cobalt or copper catalyst or by using an initial material containing halogen or phosphate, butene-diols are obtained at gentle temperatures, e. g. from 20° to 80° C., and corresponding pressures, e. g. 30 to 150 atmospheres. Less active catalysts are suitable for the partial saturation of the acetylene linkage, for example sulphides, such as molybdenum sulphide or the oxides of copper, nickel, chromium, or mixtures thereof, if desired, admixed with barium or zinc.

If the hydrogenation is to be conducted to yield normal butanols, catalysts are preferable which are suitable for the preparation of alcohols from acids or acid derivatives, especially copper or nickel catalysts or copper-nickel catalysts, if desired, in the activated form, applied to carriers, e. g. silica gel, pumice stone, aluminum oxide and the like. Thus by hydrogenating butin-2-diol-1.4 with the aid of a copper catalyst applied to silica gel, mixtures of butane-diol-1.4 and normal butanol in varying proportions are obtained according to the temperature and pressure conditions. The higher the temperature chosen, the more the relative proportions are displaced in favor of butanol. Especially good yields of butanol are obtained at temperatures above 100° C., for example at temperatures between 130° and 200° C.

By working at still higher temperatures, preferably above 200° C., tetrahydrofuranes are directly formed in the hydrogenation of butin-diols with simultaneous splitting off of water. In this case it is preferable to hydrogenate in the gas phase; atmospheric or reduced pressure may be used. The catalysts are preferably used applied to carriers or in the form of mixed catalysts which act at the same time to split off water.

In the preparation of butane-diols it is preferable to reduce the catalysts before their use or to use catalysts which are readily converted into a highly active state under the reaction conditions.

The following examples will further illustrate how this invention may be carried out in practice, but the invention is not restricted to these examples. The parts are by volume unless otherwise stated.

*Example 1*

300 parts per hour of an aqueous 35 per cent solution of butin-2-diol-1.4 are pumped through a vertical vessel containing 1900 parts of a nickel catalyst applied to pumice stone and excess hydrogen is led in circulation under a pressure of 200 atmospheres. At a temperature of 50° C., butane-diol-1.4 is obtained in a yield of more than 95 per cent of the theoretical yield.

By working under the same conditions at temperatures between 100° and 120° C., butane-diol-1.4 is obtained in a yield of from 97 to 98 per cent with from 2 to 3 per cent of normal butanol. At 150° C. and still higher temperatures, the yield of butane-diol is reduced to from 80 to 85 per cent by the formation of larger amounts of normal butanol.

*Example 2*

500 parts per hour of an aqueous 35 per cent solution of butin-2-diol-1.4 are pumped through a vertical vessel charged with 1900 parts of a catalyst containing about 80 per cent of pumice stone coated with about 13 per cent of nickel, about 6 per cent of copper and about 0.8 per cent of chromium. Hydrogen is led in circulation under a pressure of 400 atmospheres. At a temperature between 15 and 50° C. butane-diol-1.4 is obtained in a yield of from 97 to 98 per cent of the theoretical yield.

*Example 3*

If 300 parts of an aqueous 60 per cent solution of butin-2-diol-1.4 and hydrogen be pumped per hour under a pressure of 300 atmospheres over 1000 parts of a catalyst consisting of palladium on silica gel, butane-diol-1.4 is obtained in practically the theoretical yield at from 40° to 50° C. The excess hydrogen is supplied again to the reaction through circulatory pumps.

*Example 4*

For the hydrogenation there is used a vertical high-pressure tube containing 1900 parts of a copper catalyst on silica gel. 300 parts per hour of an aqueous 35 per cent solution of butin-2-diol-1.4 are supplied and hydrogen is pumped in circulation under a pressure of 200 atmospheres therethrough. At a temperature of 120° C. the yield of normal butanol is from 62 to 68 per cent and that of butane-diol-1.4 from 30 to 35 per cent. By raising the temperature to from 140° to 150° C., the yield of normal butanol may be increased to more than 75 per cent of the theoretical yield under otherwise identical conditions.

By working under otherwise identical conditions with platinum on active carbon as the catalyst and by mixing from 10 to 20 per cent of carbon monoxide with the hydrogen or by adding from 0.1 to 1 per cent of a substance containing phosphate as for example secondary sodium phosphate, to the butin-diol-solution, there is obtained with an hourly supply of 300 parts of butin-diol solution and under a pressure of 100 atmospheres of hydrogen at from 50° to 100° C. a good yield of butene-diol-1.4.

By using a catalyst consisting of nickel on pumice stone and which has been used for a long time in the hydrogenation to butane-diol and is thus weakened in its activity, butene-diol is obtained in a good yield at temperatures of from 80 to 100° C. and at a hydrogen pressure of from 20 to 100 atmospheres. The addition of compounds containing halogen or phosphate to the butin-diol solution or of carbon monoxide to the hydrogen is unnecessary in this case.

*Example 5*

Through a vaporiser the temperature of which lies between 250 and 300° C. 50 parts of an aqueous 35 per cent solution of butin-diol-1.4 are led per hour. The vapors are led in admixture with excess hydrogen under atmospheric pressure through a vessel heated to from 220° to 230° C. in which there are 350 parts of a nickel catalyst precipitated on pumice stone. More than 50 per cent of butane-diol-1.4 are obtained in addition to tetrahydrofurane, dihydrofurane and propionaldehyde.

What we claim is:

1. The production of aliphatic dihydric alcohols which comprises continuously leading a butin-2-diol-1.4 in the liquid phase together with an excess of hydrogen at temperatures between 15 and 200° C. over a hydrogenation catalyst selected from the group consisting of nickel and cobalt applied to a carrier.

2. The production of aliphatic dihydric alcohols containing four carbon atoms which comprises continuously leading butin-2-diol-1.4 in the liquid phase together with an excess of hydrogen at temperatures between 15 and 200° C. over a hydrogenation catalyst selected from the group consisting of nickel and cobalt applied to a carrier.

3. The production of aliphatic dihydric alcohols containing four carbon atoms which comprises continuously leading in the liquid phase butin-2-diol-1.4 together with an excess of hydrogen at temperatures between 15 and 200° C. under superatmospheric pressure over a hydrogenation catalyst selected from the group consisting of nickel and cobalt applied to a carrier.

4. The process of producing butanediol-1.4 which comprises continuously leading in the liquid phase at temperatures between 15° and 100° C. and under a pressure of at least 200 atmospheres butin-2-diol-1.4 together with an excess of hydrogen over a metallic hydrogenation catalyst selected from the group consisting of nickel and cobalt applied to a carrier.

5. The process of producing butanediol-1.4 which comprises continuously leading an aqueous solution of butin-2-diol-1.4 together with hydrogen at temperatures between 15° and 100° C. and under a pressure of at least 200 atmospheres over a metallic hydrogenation catalyst selected from the group consisting of nickel and cobalt applied to a carrier.

6. The process of producing butanediol-1.4 which comprises continuously leading an aqueous solution of butin-2-diol-1.4 together with hydrogen at temperatures between 15° and 100° C. and under a pressure of at least 200 atmospheres over a nickel-copper catalyst containing a preponderating amount of nickel applied to a carrier.

7. The process of producing butanediol-1.4 which comprises continuously leading an aqueous solution of butin-2-diol-1.4 together with hydrogen at temperatures between 15° and 100° C. and under a pressure of at least 200 atmospheres over a nickel-copper-chromium catalyst containing a preponderating amount of nickel applied to a carrier.

WALTER REPPE.
WILLI SCHMIDT.
ALFRED SCHULZ.
HANS WENDERLEIN.